United States Patent Office 3,562,001
Patented Feb. 9, 1971

---

3,562,001
GLOSS COMPOSITION COMPRISING WATER SOLUBLE AND WATER INSOLUBLE MELAMINE FORMALDEHYDE RESINS FOR IMPROVING SURFACE OF ARTICLES MADE FROM MELAMINE RESINS AND METHOD OF APPLICATION THEREOF
Patrick J. McGuire, Mount Vernon, N.Y., assignor to Commercial Decal, Inc., Mount Vernon, N.Y., a corporation of New York
No Drawing. Filed Feb. 20, 1968, Ser. No. 706,769
Int. Cl. B29c *3/00;* B32f *27/00, 27/42;* B44c *1/20, 3/12*
U.S. Cl. 156—242                                           10 Claims

ABSTRACT OF THE DISCLOSURE

The gloss, lustre and abrasion resistance of articles molded from melamine resins are improved by means of a composition formed from a water soluble and water insoluble melamine resins, a thickening agent, plasticizer, solvent and catalyst. The composition is applied to the foil used to decorate the ware before application of the foil to the ware.

BACKGROUND OF THE INVENTION

Articles molded from melamine resins are in wide use and are especially popular for use in dishware. Cups and saucers, plates and bowls, etc., molded from melamine resins are attractive, light in weight, stain and abrasion resistant and much less subject to breakage than ceramic ware.

Melamine resins are formed into useful articles by compression molding at elevated temperatures and pressures. The molding process starts with a partially cured melamine resin which has been sufficiently cured to be in solid form. A block of the partially cured resin is placed in the mold under elevated temperature and pressures for about 40 seconds in the case of dishware. Larger articles may require proportionately more time. A decoration or pattern is often applied to the dishware by means of a foil—a sheet of melamine resin impregnated overlay paper on which a decorative design has been applied. The foil is applied to the article after the article has been molded. The application of the foil to the article is accomplished by a second molding cycle under the same conditions and for the same time as the first molding cycle.

The resulting article, however, whether decorated (subjected to two cycles) or undecorated (subjected to only one cycle) does not exhibit the gloss and lustre associated with ceramic ware. In an attempt to improve the gloss and lustre, another molding cycle has been employed wherein a specially formulated melamine glazing resin is applied to the formed article. Thus, thre separate molding cycles are required in the case of decorated articles, and two cycles for undecorated ware. In addition to the time required for the molding cycle itself, additional time is consumed in opening and closing the mold and in placing the glazing resin on the molded article. In short, to mold a glazed decorated melamine article takes 120 seconds of molding plus the time involved in opening and closing the mold a number of times and inserting articles in the mold.

OBJECTS OF THE INVENTION

It is, accordingly, an object of the present invention to provide compositions to impart improved gloss and lustre to articles molded from melamine resins. Another object is to provide compositions to impart improved chemical and abrasion resistance to articles molded from melamine resins. A further object is to provide a new and improved method for imparting high gloss and lustre to articles molded from melamine resins. Still another object is to provide a method for imparting gloss and lustre to articles molded from melamine resins in substantially less time than heretofore possible. These and other objects of the present invention will be apparent from the following description.

SUMMARY OF THE INVENTION

It has now been found that a composition for imparting gloss, lustre and chemical and abrasion resistance to articles molded from a melamine resin comprises a mixture of water soluble and water insoluble melamine resins, a thickening agent, plasticizer, solvent and catalyst. The composition of the present invention is conveniently applied to the foil used to decorate the molded melamine article. In this way both the decoration or pattern and the glaze are applied in the same operation.

DETAILED DESCRIPTION

The compositions of the present invention are melamine-formaldehyde thermosetting resins. They are conveniently applied to a foil which comprises a resin impregnated paper carrying a pattern. The paper, known as overlay paper, is impregnated with from 65% to 69% of a melamine-formaldehyde resin based on raw paper weight "as received." The foil is then applied to the molded article in a second molding operation.

According to the present invention the foil is coated with a glaze-imparting composition and dried before being applied to the molded article. The composition comprises a mixture of water soluble and water insoluble melamine-formaldehyde thermosetting resins, plasticizer, solvent and catalyst.

Generally, water soluble melamine-formaldehyde resins are methylated methylol melamines prepared by reacting 1 mol of melamine with from 3 to 6 mols of formaldehyde. The water insoluble melamine-formaldehyde resins are etherified with butanol or a higher alkanol, to form an alkylated methylol melamine. In general, from 5 to 6 mols of formaldehyde are used with 1 mol of melamine and an excess of alkanol. The general ratio of combined butanol to melamine is from 1 to 2 mols of butanol per mol of melamine. The water soluble melamine-formaldehyde resin should have a viscosity between from about 20 to about 30 cps. and a pH of from about 7.5 to about 9.0. Preferably, at least two water soluble melamine-formaldehyde resins having differing viscosities, are employed. One should be unplasticized and have a viscosity range of from about 20 to about 25 cps. The other resin should be plasticized and have a viscosity range of from about 20 to about 30 cps. Either resin may be present in a greater or lesser amount than the other resin. Generally, each may be present in an amount of from 0.5 to 1.5 times that of the other. Preferably, the two resins are present in approximately equal amounts.

The compositions of the present invention contain from about 5 to about 12 parts of water soluble resin per part of water insoluble resin, and preferably from about 7 parts to about 10 parts of water soluble resin per part of water insoluble resin.

The presence of a thickening agent has been found to be essential in obtaining high gloss and luster. The thickening agent is employed in quantities of from about 0.5% by weight to about 3% by weight per 100 parts by weight of resin. A preferred thickening agent is sodium carboxymethyl cellulose. Other thickening agents which can be used are for example, starch, dextrin, casein, alignates and sodium polyacrylate. The flexibility of the thickening agent may be increased by incorporating a plasticizer. The plasticizer may be present in quantities of from about 0.5% by weight to about 2% by weight per 100 parts by weight of resin. Some typical plasticizers are, for example, glycerol, diglycerol, glycerol alpha-monomethyl ether, 2,3-butylene glycol, 2-nitro-2-methyl-1, 3-propanediol, glycerol monochlorohydrin, ethylene glycol, ethanolamines, and the like.

A catalyst is employed to increase the curing time of the melamine-formaldehyde resin. The catalyst may be any acidic catalyst and is preferably an amine-containing buffered acid catalyst. The catalyst may be employed in amounts of from about 2% to about 15% by weight per 100 parts by weight of the melamine-formaldehyde resins.

Solvent may be employed to solubilize the mixture of resins, to lower surface tension and to enhance drying. Water is the preferred solvent for the water-soluble resin and a water-miscible alcohol is the preferred solvent for water-insoluble resin. The water-soluble alcohols are methanol, ethanol, propanol, isopropanol, and t-butanol. The amount of alcohol and water employed should be sufficient to permit easy application of the mixture to the foil. Generally, the alcohol is employed in an amount of from about 5% to about 20% by weight per 100 parts by weight of the resin mixture, and water is employed in an amount of from about 30% to about 50% by weight per 100 parts of the resin mixture.

The composition of the present invention are employed in amounts of from about 0.5% to about 5% by weight based on the weight of the foil.

The compositions of the present invention may be applied to the article molded from melamine resin or to the foil in any suitable manner, such as, for example, by roller coating, silk screening, brushing, spraying, dipping, calendering, etc.

The following examples illustrate the present invention without, however, limiting the same thereto.

Two foils consisting of overlay paper containing a decorative pattern and an impregnating resin, the weight of resin being 68% of the total weight of paper, were coated, respectively, with 1.5% by weight based on the weight of the foil, of the following compositions:

| Ingredient | Parts by weight | |
|---|---|---|
| | Example 1 | Example 2 |
| Unplasticized water-soluble melamine formaldehyde [1] | 27.5 | 35.0 |
| Plasticized water-soluble melamine formaldehyde [2] | 27.5 | 35.0 |
| Water-insoluble butylated melamine formaldehyde [3] | 8.5 | 10.0 |
| Amine-containing buffered acid catalyst | 5.0 | 7.0 |
| Sodium carboxymethyl cellulose | 0.85 | 1.0 |
| Plasticizer, Vircol 189 [4] | 0.85 | 1.5 |
| Water | 21.4 | 28.5 |
| Methyl alcohol | 4.2 | 8.0 |
| Isopropyl alcohol | 4.2 | 8.0 |

[1] Resin having a viscosity range of from 20–25 cps., Resimene 836.
[2] Resin having a viscosity range of 20–30 cps., Resimene 831.
[3] Resin, Cymel 404.
[4] An alkyl phosphate ester.

Each coated foil was placed on a molded melamine-formaldehyde plate with the coated side face up. Each plate and foil were subjected to compression molding for 25 seconds. The plates had excellent gloss and lustre. The plates were then compared with plates prepared in an identical manner except that the foil was not coated with a composition according to the present invention. The gloss and lustre was much inferior to the plates coated with the compositions of Examples 1 and 2.

The advantages obtained according to the present invention are readily seen by comparing a molding cycle containing an uncoated foil with a foil coated with a composition according to the present invention.

| Molding cycle with conventional uncoated foil | Molding cycle with foil coated with composition of present invention |
|---|---|
| Step: | |
| 1. Modling foil to molded article—40 seconds | Modling foil to article—25 seconds. |
| 2. Opening mold | Do. |
| 3. Placing gloss pill on foil coated article | Removing fininshed article. |
| 4. Closing mold | |
| 5. Molding gloss coating to article—40 seconds | |
| 6. Opening mold | |
| 7. Removing article | |

It is apparent that what requires 7 steps according to the prior art methods is accomplished in only 3 steps with substantial savings in time according to the process of the present invention. This saving of time enables substantially greater production to be achieved.

While the present invention has been described with reference to a particular mode of application, namely, coating a foil, it will be obvious to those skilled in the art that the step of coating a foil could be eliminated by initially impregnating overlay paper with the compositions of the present invention.

What I claim is:

1. A molding composition having improved gloss and lustre imparting characteristics which consists essentially of from about 5 parts by weight to about 12 parts by weight of a water-soluble melamine-formaldehyde resin per about 1 part by weight of a water-insoluble melamine-formaldehyde resin which has been etherified with an alkanol of at least 4 C atoms, and based on 100 parts by weight of resin, from about 0.5% to about 3% by weight of a thickening agent, from about 0.5% to about 2% by weight of plasticizer, from about 2% to about 15% by weight of an acidic catalyst to cure the resins and from about 35% to about 70 by weight of solvent.

2. A composition according to claim 1 wherein the water-soluble resin is present in an amount of from about 7 parts by weight to about 10 parts by weight per part of water-insoluble resin and wherein the water soluble resin comprises a plasticized resin having a viscosity range of from about 20 cps. to about 30 cps., and an unplasticized resin having a viscosity range of from about 20 cps. to about 25 cps.

3. A composition according to claim 2 wherein the thickening agent is sodium carboxymethyl cellulose.

4. A composition according to claim 3 wherein the solvent comprises from about 5% to about 20% by weight of alcohol, and from about 30% to about 50% by weight of water.

5. A method of improving the gloss and lustre of an article molded from a melamine-formaldehyde resin which comprises applying the composition of claim 1 to a foil, drying the foil, applying the foil to the article and compression molding at elevated temperature and pressure to cure.

6. A foil comprising melamine-formaldehyde decorated overlay paper coated with from about 0.5% to about 5% by weight of the foil of a molding composition consisting essentially of from about 5 parts by weight to about 12 12 parts by weight of a water soluble melamine-formaldehyde resin to about 1 part by weight of a water-insoluble melamine-formaldehyde resin which has been etherified with an alkanol of at least 4 C atoms, and based on 100 parts by weight of resin, from about 0.5% to about 3% by weight of a thickening agent, from about 0.5% to about 2% by weight of plasticizer and from about 2% to about 15% by weight of an acidic catalyst to cure the resins.

7. A foil according to claim 6 wherein the water soluble resin comprises a plasticized resin having a viscosity range of from about 20 cps. to about 30 cps., and an unplasticized resin having a viscosity range of from about 20 cps. to about 25 cps.

8. A foil according to claim 7 wherein the thickening agent is sodium carboxymethyl cellulose.

9. A method for improving the gloss of an article molded from a melamine-formaldehyde resin which comprises applying to the article a composition consisting essentially of from about 5 parts by weight to about 12 parts by weight of a water insoluble melamine-formaldehyde resin per about 1 part by weight of a water-insoluble melamine-formaldehyde resin which has been etherified with an alkanol of at least 4 C atoms, and based on 100 parts by weight of resin, from about 0.5% to about 3% by weight of a thickening agent, from about 0.5% to about 2% by weight of plasticizer and from about 2% to about 15% by weight of an acidic catalyst to cure the resins, and curing the composition.

10. A method according to claim 9 wherein the thickening agent is sodium carboxymethyl cellulose.

References Cited

UNITED STATES PATENTS

| | | | |
|---|---|---|---|
| 2,336,484 | 12/1943 | Klinkenstein | 260—15 |
| 2,487,766 | 11/1949 | Schmidt | 260—29.4 |
| 2,964,426 | 12/1960 | Holtschmidt | 161—263 |
| 2,646,380 | 7/1953 | Barlow et al. | 156—224 |
| 3,057,018 | 10/1962 | Lawrence et al. | 156—224 |
| 3,117,053 | 1/1964 | Lawrence et al. | 156—224 |
| 3,379,592 | 4/1968 | Ostrowicz | 156—224 |

HAROLD D. ANDERSON, Primary Examiner

E. WOODBURY, Assistant Examiner

U.S. Cl. X.R.

117—73, 76, 138.8; 156—196, 224, 306; 161—263; 260—15, 17.3, 29.4, 33.4, 849